(12) United States Patent
Fu et al.

(10) Patent No.: US 11,680,020 B2
(45) Date of Patent: Jun. 20, 2023

(54) TITANIUM-CONTAINING CALCIUM HEXAALUMINATE MATERIAL AND PREPARATION METHOD THEREOF

(71) Applicant: Wuhan University of Science and Technology, Wuhan (CN)

(72) Inventors: Lvping Fu, Wuhan (CN); Huazhi Gu, Wuhan (CN); Ao Huang, Wuhan (CN); Meijie Zhang, Wuhan (CN)

(73) Assignee: WUHAN UNIVERSITY OF SCIENCE AND TECHNOLOGY, Wuhan (CN)

( * ) Notice: Subject to any disclaimer, the term of this patent is extended or adjusted under 35 U.S.C. 154(b) by 0 days.

(21) Appl. No.: 17/195,581

(22) Filed: Mar. 8, 2021

(65) Prior Publication Data

US 2021/0284579 A1  Sep. 16, 2021

(30) Foreign Application Priority Data

Mar. 13, 2020 (CN) .......................... 202010175493.8

(51) Int. Cl.
| | | |
|---|---|---|
| *C04B 35/44* | (2006.01) | |
| *C04B 35/626* | (2006.01) | |
| *C04B 35/64* | (2006.01) | |
| *C22B 9/16* | (2006.01) | |

(52) U.S. Cl.
CPC .......... *C04B 35/44* (2013.01); *C04B 35/6261* (2013.01); *C04B 35/62655* (2013.01); *C04B 35/64* (2013.01); *C04B 2235/3208* (2013.01); *C04B 2235/3217* (2013.01); *C04B 2235/3222* (2013.01); *C04B 2235/3232* (2013.01); *C04B 2235/3262* (2013.01); *C04B 2235/442* (2013.01); *C04B 2235/5436* (2013.01); *C04B 2235/604* (2013.01); *C04B 2235/606* (2013.01); *C04B 2235/6567* (2013.01); *C04B 2235/9676* (2013.01); *C22B 9/16* (2013.01)

(58) Field of Classification Search
CPC ............ C04B 35/44; C04B 2235/3208; C04B 2235/3217; C04B 2235/3232; C04B 2235/3262
See application file for complete search history.

(56) References Cited

U.S. PATENT DOCUMENTS

| 3,312,558 A | * | 4/1967 | Miller, Jr. ............... C04B 35/42 502/439 |
| 4,960,737 A | * | 10/1990 | Guile ..................... B32B 18/00 501/153 |

FOREIGN PATENT DOCUMENTS

| CN | 105585314 A | * | 5/2016 | ........... C04B 35/101 |
| CN | 110171980 A | * | 8/2019 | ........... C04B 35/101 |
| EP | 1178023 A1 | * | 2/2002 | ......... C04B 35/1015 |

OTHER PUBLICATIONS

CN-105585314-A (Yin) May 18, 2016 (English language machine translation). [retrieved Feb. 9, 2023]. Retrieved from: Clarivate Analytics. (Year: 2016).*
CN-110171980-A (Ding) Aug. 27, 2019 (English language machine translation). [retrieved Feb. 9, 2023]. Retrieved from: Clarivate Analytics. (Year: 2019).*

* cited by examiner

*Primary Examiner* — Erin Snelting
(74) *Attorney, Agent, or Firm* — Daniel M. Cohn; Howard M. Cohn

(57) ABSTRACT

A titanium-containing calcium hexaaluminate material and preparation method thereof is disclosed. The technical solution is: using 60~80 wt % alumina micro powder, 5~20 wt % calcium-containing micro powder, 10~20 wt % titania micro powder and 1~10 wt % manganese oxide micro powder as raw materials, blending the raw materials evenly in a planetary ball mill to obtain a blend, machine pressing the blend at 100~200 MPa to obtain a green body, drying the green body at 110~200° C. for 12~36 h, and incubating the dried green body at 1500~1800° C. for 1~8 h to obtain the titanium-containing calcium hexaaluminate material. The present disclosure has low cost and simple process, and the prepared titanium-containing calcium hexaaluminate material has the characteristics of good chemical stability, high thermal shock resistance and strong melt resistance to titanium-aluminum alloy.

5 Claims, No Drawings

TITANIUM-CONTAINING CALCIUM HEXAALUMINATE MATERIAL AND PREPARATION METHOD THEREOF

TECHNICAL FIELD

The present disclosure relates to the field of refractory material technology, and more specifically, to a titanium-containing calcium hexaaluminate material and preparation method thereof.

BACKGROUND

Titanium-aluminum alloy has low density, high strength, high specific stiffness, good heat resistance, excellent high temperature creep resistance and good oxidation resistance, and is the preferred material for the ultrahigh-speed aircraft and the next-generation advanced aero-engine. The chemical activity of the titanium-aluminum alloy melt is high at high temperature. During the smelting process, it is easy to react with the refractory crucible to pollute the alloy melt. Development of refractory materials with superior performance used for titanium-aluminum alloy melting is a key prerequisite for the preparation of high-quality titanium-aluminum alloy.

The $CaO$—$Al_2O_3$—$TiO_2$ system material with both $TiO_2$ and $Al_2O_3$ components can simultaneously suppress the erosion of Ti and Al components in the alloy melt when it is in contact with the Ti aluminum alloy melt. Therefore, it is a potentially important material of refractory materials for titanium aluminum alloy melting.

Titanium-containing calcium hexaaluminate ($Ca((Al_{0.84}Ti_{0.16})_2)_6O_{19}$) is the only material phase in the $CaO$—$Al_2O_3$—$TiO_2$ system that can exist stably at temperatures above 1600° C. Therefore, the synthesis of high-purity, single-phase titanium-containing calcium hexaaluminate materials is an important topic in the research field for $CaO$—$Al_2O_3$—$TiO_2$ system material.

At present, some research has been carried out around the world for the preparation of $CaO$—$Al_2O_3$—$TiO_2$ system material. Fan Chun Hong et al., prepared $CaO$—$Al_2O_3$—$TiO_2$ materials by solid-phase synthesis using aluminum containing waste residue, calcium oxide, alumina, zirconia as the main materials (Van Chun Hong et al. Effect of $ZrO_2$ on Composition and Ctructure of Perovskite/Calcium Hexaaluminate Material [J], silicate bulletin, 2013, 32 (8): 1534-1539). However, the high temperature chemical stability of the material is not good, and the $TiO_2$ component is prone to undergo desolvation during cooling, and after cooling, the material is a perovskite/calcium hexaaluminate complex phase material, which does not exist as a titanium-containing calcium hexaaluminate material phase. The adopted preparation process of dry grinding and humidification grinding is a complex process with high energy consumption and cost. Upon contact with titanium aluminum alloy melt, the calcium titanium mineral phase is susceptible to the erosion of Al component due to the material component inhomogeneity, while the calcium hexaaluminate mineral phase is susceptible to the erosion of Ti component.

Chen et al. prepared $CaO$—$Al_2O_3$—$TiO_2$ materials by electrofusion remelting, homogenization, reduction and other technical methods using the smelt waste residues of titanium iron alloy (Chen, et al. Microstructure and properties of high alumina castables containing calcium alumino-titanate[J]. International Journal of Applied Ceramic Technology, 2018, 15(6):1478-1483). However, the preparation process by electrofusion method has higher energy consumption than sintering method, which has high cost and complicated preparation process. Secondly, the material contains low content of titanium-containing calcium hexaaluminate material phase, and there is a large amount of calcium hexaaluminate, calcium dialluminate and calcium titanate material phase. The composition of the material phase is too complex, which leads to poor chemical stability and thermal shock resistance. Finally, upon contact with the titanium aluminum alloy melt, due to the inhomogeneous material components, it is susceptible to erosion of the alloy melt.

SUMMARY

In view of the above, an object of the present disclosure is to provide a low-cost and simple preparation method of titanium-containing calcium hexaaluminate material. The titanium-containing calcium hexaaluminate material prepared by the method has good chemical stability, good thermal shock resistance and strong melt resistance to titanium-aluminum alloy melt.

Technical solutions of the present disclosure are specifically described as follows.

A preparation method of a titanium-containing calcium hexaaluminate material is provided, including: using 60~80 wt % alumina micro powder, 5~20 wt % calcium-containing micro powder, 10~20 wt % titania micro powder and 1~10 wt % manganese oxide micro powder as raw materials, blending the raw materials evenly in a planetary ball mill to obtain a blend, machine pressing the blend at 100~200 MPa to obtain a green body, drying the green body at 110~200° C. for 12~36 h, and incubating the dried green body at 1500~1800° C. for 1~8 h to obtain the titanium-containing calcium hexaaluminate material.

A $Al_2O_3$ content of the alumina micro powder is 98 wt % or more, and a particle size $D_{50}$ of the alumina micro powder is 1~8 μm.

More than one of calcium hydroxide and calcium carbonate is used in the calcium-containing micro powder, and a particle size $D_{50}$ of the calcium-containing micro powder is 1~10 μm.

A $TiO_2$ content of the titania micro powder is 90 wt % or more, and a particle size $D_{50}$ of the titania micro powder 1~10 μm.

A MnO content of the manganese oxide micro powder is 90 wt % or more, and a particle size D50 of the manganese oxide micro powder 1~8 μm.

Compared with the prior art, the disclosure has the following beneficial effects.

(1) The alumina micro powder, calcium micro powder, titania micro powder and manganese oxide micro powder are taken as raw materials, blended evenly, machine pressed into shape, dried and treated by high-temperature heat to obtain the titanium-containing calcium hexaaluminate material with simple process. The raw materials used in the disclosure have wide sources. In addition, compared with the electrofusion method, the energy consumption of the titanium-containing calcium hexaaluminate material prepared by the sintering method is lower. Therefore, the production cost is low.

(2) The calcium-containing micro powder used in the disclosure decomposes during the heat treatment process to form high activity CaO powder, which can react rapidly with other micro powder raw materials. In addition, the introduced manganese oxide micro powder can replace aluminum ions and titanium ions by solution treatment. On the one hand, the reaction of raw materials is promoted to form $Ca((Al_{0.84}Ti_{0.16})_2)_6O_{19}$ titanium-containing calcium hexaaluminate phase; on the other hand, the lattice of titanium-containing calcium hexaaluminate phase is stabilized to prevent desolvation during cooling. Therefore, the $TiO_2$ component in the titanium-containing calcium hexaaluminate material can stably exist in the titanium-containing calcium hexaaluminate phase during the cooling process, which is not easy to desolvent and has good chemical stability.

(3) The $TiO_2$ components in the present disclosure are all able to stably exist in the titanium-containing calcium hexaaluminate phase during the heating-cooling process, avoiding the occurrence of solution-desolvation phenomenon during the heating-cooling process. When the temperature change occurs, the material internal components and the structural changes are not large, which effectively reduces the probability of heat stress generation. Therefore, the titanium-containing calcium hexaaluminate material has good thermal shock resistance.

(4) The product of the present disclosure has a low content of impurity phases, where the main material phase composition is $Ca((Al_{0.84}Ti_{0.16})_2)_6O_{19}$ phase. The material components are uniform with both $TiO_2$ and $Al_2O_3$ components in the material phase. When it is in contact with the titanium-aluminum alloy melt, the interactions of Ti components and Al components in the alloy melt and the refractory material are inhibited simultaneously. Therefore, the erosion of the titanium aluminum alloy melt is better resisted. The product is an ideal raw material to prepare refractory materials for titanium-aluminum alloy melting.

As examined, the content of $Ca((Al_{0.84}Ti_{0.16})_2)_6O_{19}$ phase in the titanium-containing calcium hexaaluminate material prepared in the present disclosure was more than 90 wt %.

Therefore, the present disclosure has low cost and simple process, and the prepared titanium-containing calcium hexaaluminate material has the characteristics of good chemical stability, high thermal shock resistance and strong melt resistance to titanium-aluminum alloy, which is an ideal raw material for preparing refractory material for titanium-aluminum alloy melting.

DETAILED DESCRIPTION OF EMBODIMENTS

The disclosure is further described below in combination with specific embodiments, not as a limitation to its scope of protection.

To avoid duplication, the raw materials involved in the embodiments are uniformly described as follows and are not given unnecessary details in the particular embodiments.

The $Al_2O_3$ content of the alumina micro powder was 98 wt % or more, and the particle size $D_{50}$ of the alumina micro powder was 1~8 μm.

The particle size $D_{50}$ of the calcium-containing containing micro powder was 1~10 μm.

The $TiO_2$ content of the titanium oxide micro powder is 90 wt % or more, and the particle size $D_{50}$ of the titanium oxide micro powder is 1~10 μm.

The MnO content of the manganese oxide micro powder is 90 wt % or more, and the particle size $D_{50}$ of the manganese oxide micro powder is 1~8 μm.

Embodiment 1

A titanium-containing calcium hexaaluminate material and preparation method thereof. 60~65 wt % alumina micro powder, 15~20 wt % calcium-containing micro powder, 15~20 wt % titania micro powder and 1~6 wt % manganese oxide micro powder were used as raw materials. The raw materials were blended evenly in a planetary ball mill to obtain a blend. The blend was machine pressed at 100~150 MPa to obtain a green body. The green body was dried at 150~200° C. for 12~24 h. The dried green body was incubated at 1500~1650° C. for 4~8 h to obtain the titanium-containing calcium hexaaluminate material.

The calcium-containing micro powder is calcium hydroxide.

The titanium-containing calcium hexaaluminate material prepared in this embodiment was tested to have a $Ca((Al_{0.84}Ti_{0.16})_2)O_{19}$ phase content greater than 92 wt %.

Embodiment 2

A titanium-containing calcium hexaaluminate material and preparation method thereof. 60~65 wt % alumina micro powder, 15~20 wt % calcium-containing micro powder, 15~20 wt % titania micro powder and 1~6 wt % manganese oxide micro powder were used as raw materials. The raw materials were blended evenly in a planetary ball mill to obtain a blend. The blend was machine pressed at 150~200 MPa to obtain a green body. The green body was dried at 110~160° C. for 24~36 h. The dried green body was incubated at 1650~1800° C. for 1~5 h to obtain the titanium-containing calcium hexaaluminate material.

The calcium-containing micro powder is calcium carbonate.

The titanium-containing calcium hexaaluminate material prepared in this embodiment was tested to have a $Ca((Al_{0.84}Ti_{0.16})_2)O_{19}$ phase content greater than 92 wt %.

Embodiment 3

A titanium-containing calcium hexaaluminate material and preparation method thereof. 60~65 wt % alumina micro powder, 15~20 wt % calcium-containing micro powder, 15~20 wt % titania micro powder and 4~10 wt/manganese oxide micro powder were used as raw materials. The raw materials were blended evenly in a planetary ball mill to obtain a blend. The blend was machine pressed at 100~150 MPa to obtain a green body. The green body was dried at 150~200° C. for 12~24 h. The dried green body was incubated at 1500~1650° C. for 4~8 h to obtain the titanium-containing calcium hexaaluminate material.

The calcium-containing micro powder is a mixture of calcium hydroxide and calcium carbonate.

The titanium-containing calcium hexaaluminate material prepared in this embodiment was tested to have a $Ca((Al_{0.84}Ti_{0.16})_2)O_{19}$ phase content greater than 90 wt %.

Embodiment 4

A titanium-containing calcium hexaaluminate material and preparation method thereof. 60~65 wt % alumina micro powder, 15~20 wt % calcium-containing micro powder, 15~20 wt % titania micro powder and 4~10 wt/manganese oxide micro powder were used as raw materials. The raw materials were blended evenly in a planetary ball mill to obtain a blend. The blend was machine pressed at 100~150 MPa to obtain a green body. The green body was dried at 110~160° C. for 24~36 h. The dried green body was incubated at 1650~1800° C. for 1~5 h to obtain the titanium-containing calcium hexaaluminate material.

The calcium-containing micro powder is calcium hydroxide.

The titanium-containing calcium hexaaluminate material prepared in this embodiment was tested to have a Ca((Al$_{0.84}$Ti$_{0.16}$)$_2$)O$_{19}$ phase content greater than 90 wt %.

Embodiment 5

A titanium-containing calcium hexaaluminate material and preparation method thereof. 65~67 wt % alumina micro powder, 12~17 wt % calcium-containing micro powder, 13~18 wt % titania micro powder and 1~6 wt % manganese oxide micro powder were used as raw materials. The raw materials were blended evenly in a planetary ball mill to obtain a blend. The blend was machine pressed at 100~150 MPa to obtain a green body. The green body was dried at 150~200° C. for 12~24 h. The dried green body was incubated at 1500~1650° C. for 4~8 h to obtain the titanium-containing calcium hexaaluminate material.

The calcium-containing micro powder is calcium carbonate.

The titanium-containing calcium hexaaluminate material prepared in this embodiment was tested to have a Ca((Al$_{0.84}$Ti$_{0.16}$)$_2$)O$_{19}$ phase content greater than 93 wt %.

Embodiment 6

A titanium-containing calcium hexaaluminate material and preparation method thereof. 65~67 wt % alumina micro powder, 12~17 wt % calcium-containing micro powder, 13~18 wt % titania micro powder and 1~6 wt % manganese oxide micro powder were used as raw materials. The raw materials were blended evenly in a planetary ball mill to obtain a blend. The blend was machine pressed at 150~200 MPa to obtain a green body. The green body was dried at 110~160° C. for 24~36 h. The dried green body was incubated at 1650~1800° C. for 1~5 h to obtain the titanium-containing calcium hexaaluminate material.

The calcium-containing micro powder is a mixture of calcium hydroxide and calcium carbonate.

The titanium-containing calcium hexaaluminate material prepared in this embodiment was tested to have a Ca((Al$_{0.84}$Ti$_{0.16}$)$_2$)O$_{19}$ phase content greater than 93 wt %.

Embodiment 7

A titanium-containing calcium hexaaluminate material and preparation method thereof. 65~67 wt % alumina micro powder, 12~17 wt % calcium-containing micro powder, 13~18 wt % titania micro powder and 4~10 wt/manganese oxide micro powder were used as raw materials. The raw materials were blended evenly in a planetary ball mill to obtain a blend. The blend was machine pressed at 100~150 MPa to obtain a green body. The green body was dried at 150~200° C. for 12~24 h. The dried green body was incubated at 1650~1800° C. for 4~8 h to obtain the titanium-containing calcium hexaaluminate material.

The calcium-containing micro powder is calcium hydroxide.

The titanium-containing calcium hexaaluminate material prepared in this embodiment was tested to have a Ca((Al$_{0.84}$Ti$_{0.16}$)$_2$)O$_{19}$ phase content greater than 91 wt %.

Embodiment 8

A titanium-containing calcium hexaaluminate material and preparation method thereof. 65~70 wt % alumina micro powder, 12~17 wt % calcium-containing micro powder, 13~18 wt % titania micro powder and 4~10 wt/manganese oxide micro powder were used as raw materials. The raw materials were blended evenly in a planetary ball mill to obtain a blend. The blend was machine pressed at 150~200 MPa to obtain a green body. The green body was dried at 110~160° C. for 24~36 h. The dried green body was incubated at 1650~1800° C. for 1~5 h to obtain the titanium-containing calcium hexaaluminate material.

The calcium-containing micro powder is calcium carbonate.

The titanium-containing calcium hexaaluminate material prepared in this embodiment was tested to have a Ca((Al$_{0.84}$Ti$_{0.16}$)$_2$)O$_{19}$ phase content greater than 90 wt %.

Embodiment 9

A titanium-containing calcium hexaaluminate material and preparation method thereof. 70~75 wt % alumina micro powder, 8~13 wt % calcium-containing micro powder, 12~16 wt % titania micro powder and 1~6 wt % manganese oxide micro powder were used as raw materials. The raw materials were blended evenly in a planetary ball mill to obtain a blend. The blend was machine pressed at 100~150 MPa to obtain a green body. The green body was dried at 150~200° C. for 12~24 h. The dried green body was incubated at 1500~1650° C. for 4~8 h to obtain the titanium-containing calcium hexaaluminate material.

The calcium-containing micro powder is a mixture of calcium hydroxide and calcium carbonate.

The titanium-containing calcium hexaaluminate material prepared in this embodiment was tested to have a Ca((Al$_{0.84}$Ti$_{0.16}$)$_2$)O$_{19}$ phase content greater than 94 wt %.

Embodiment 10

A titanium-containing calcium hexaaluminate material and preparation method thereof. 70~75 wt % alumina micro powder, 8~13 wt % calcium-containing micro powder, 12~16 wt % titania micro powder and 1~6 wt % manganese oxide micro powder were used as raw materials. The raw materials were blended evenly in a planetary ball mill to obtain a blend. The blend was machine pressed at 150~200 MPa to obtain a green body. The green body was dried at 110~160° C. for 24~36 h. The dried green body was incubated at 1650~1800° C. for 1~5 h to obtain the titanium-containing calcium hexaaluminate material.

The calcium-containing micro powder is calcium hydroxide.

The titanium-containing calcium hexaaluminate material prepared in this embodiment was tested to have a Ca((Al$_{0.84}$Ti$_{0.16}$)$_2$)O$_{19}$ phase content greater than 94 wt %.

Embodiment 11

A titanium-containing calcium hexaaluminate material and preparation method thereof. 70~75 wt % alumina micro powder, 8~13 wt % calcium-containing micro powder, 12~16 wt % titania micro powder and 4~10 wt/manganese oxide micro powder were used as raw materials. The raw materials were blended evenly in a planetary ball mill to obtain a blend. The blend was machine pressed at 100~150 MPa to obtain a green body. The green body was dried at 150~200° C. for 12~24 h. The dried green body was incubated at 1500~1650° C. for 4~8 h to obtain the titanium-containing calcium hexaaluminate material.

The calcium-containing micro powder is calcium carbonate.

The titanium-containing calcium hexaaluminate material prepared in this embodiment was tested to have a Ca((Al$_{0.84}$Ti$_{0.16}$)$_2$)O$_{19}$ phase content greater than 91 wt %.

Embodiment 12

A titanium-containing calcium hexaaluminate material and preparation method thereof. 70~75 wt % alumina micro powder, 8~13 wt % calcium-containing micro powder, 12~16 wt % titania micro powder and 4~10 wt/manganese oxide micro powder were used as raw materials. The raw materials were blended evenly in a planetary ball mill to obtain a blend. The blend was machine pressed at 150~200 MPa to obtain a green body. The green body was dried at 110~160° C. for 24~36 h. The dried green body was incubated at 1650~1800° C. for 1~5 h to obtain the titanium-containing calcium hexaaluminate material.

The calcium-containing micro powder is a mixture of calcium hydroxide and calcium carbonate.

The titanium-containing calcium hexaaluminate material prepared in this embodiment was tested to have a Ca((Al$_{0.84}$Ti$_{0.16}$)$_2$)$_6$O$_{19}$ phase content greater than 92 wt %.

Embodiment 13

A titanium-containing calcium hexaaluminate material and preparation method thereof. 75~80 wt % alumina micro powder, 5~10 wt/calcium-containing micro powder, 10~14 wt % titania micro powder and 1~6 wt % manganese oxide micro powder were used as raw materials. The raw materials were blended evenly in a planetary ball mill to obtain a blend. The blend was machine pressed at 100~150 MPa to obtain a green body. The green body was dried at 150~200° C. for 12~24 h. The dried green body was incubated at 1500~1650° C. for 4~8 h to obtain the titanium-containing calcium hexaaluminate material.

The calcium-containing micro powder is calcium hydroxide.

The titanium-containing calcium hexaaluminate material prepared in this embodiment was tested to have a Ca((Al$_{0.84}$Ti$_{0.16}$)$_2$)O$_{19}$ phase content greater than 95 wt %.

Embodiment 14

A titanium-containing calcium hexaaluminate material and preparation method thereof. 75~80 wt % alumina micro powder, 5~10 wt/calcium-containing micro powder, 1~14 wt % titania micro powder and 1~6 wt % manganese oxide micro powder were used as raw materials. The raw materials were blended evenly in a planetary ball mill to obtain a blend. The blend was machine pressed at 150~200 MPa to obtain a green body. The green body was dried at 110~160° C. for 24~36 h. The dried green body was incubated at 1650~1800° C. for 1~5 h to obtain the titanium-containing calcium hexaaluminate material.

The calcium-containing micro powder is calcium carbonate.

The titanium-containing calcium hexaaluminate material prepared in this embodiment was tested to have a Ca((Al$_{0.84}$Ti$_{0.16}$)$_2$)O$_{19}$ phase content greater than 95 wt %.

Embodiment 15

A titanium-containing calcium hexaaluminate material and preparation method thereof. 75~80 wt % alumina micro powder, 5~10 wt/calcium-containing micro powder, 10~14 wt % titania micro powder and 4~10 wt/manganese oxide micro powder were used as raw materials. The raw materials were blended evenly in a planetary ball mill to obtain a blend. The blend was machine pressed at 100~150 MPa to obtain a green body. The green body was dried at 150~200° C. for 12~24 h. The dried green body was incubated at 1500~1650° C. for 4~8 h to obtain the titanium-containing calcium hexaaluminate material.

The calcium-containing micro powder is a mixture of calcium hydroxide and calcium carbonate.

The titanium-containing calcium hexaaluminate material prepared in this embodiment was tested to have a Ca((Al$_{0.84}$Ti$_{0.16}$)$_2$)O$_{19}$ phase content greater than 92 wt %.

Embodiment 16

A titanium-containing calcium hexaaluminate material and preparation method thereof. 75~80 wt % alumina micro powder, 5~10 wt/calcium-containing micro powder, 10~14 wt % titania micro powder and 4~10 wt % manganese oxide micro powder were used as raw materials. The raw materials were blended evenly in a planetary ball mill to obtain a blend. The blend was machine pressed at 150~200 MPa to obtain a green body. The green body was dried at 110~160° C. for 24~36 h. The dried green body was incubated at 1650~1800° C. for 1~5 h to obtain the titanium-containing calcium hexaaluminate material.

The calcium-containing micro powder is a mixture of calcium hydroxide and calcium carbonate.

The titanium-containing calcium hexaaluminate material prepared in this embodiment was tested to have a Ca((Al$_{0.84}$Ti$_{0.16}$)$_2$)$_6$O$_{19}$ phase content greater than 91 wt %.

Compared with the prior art, the disclosure has the following beneficial effects.

(1) The alumina micro powder, calcium micro powder, titania micro powder and manganese oxide micro powder are taken as raw materials, blended evenly, machine pressed into shape, dried and treated by high-temperature heat to obtain the titanium-containing calcium hexaaluminate material with simple process. The raw materials used in the disclosure have wide sources. In addition, compared with the electrofusion method, the energy consumption of the titanium-containing calcium hexaaluminate material prepared by the sintering method is lower. Therefore, the production cost is low.

(2) The calcium-containing micro powder used in the disclosure decomposes during the heat treatment process to form high activity CaO powder, which can react rapidly with other micro powder raw materials. In addition, the introduced manganese oxide micro powder can replace aluminum ions and titanium ions by solution treatment. On the one hand, the reaction of raw materials is promoted to form Ca((Al$_{0.84}$Ti$_{0.16}$)$_2$)$_6$O$_{19}$ titanium-containing calcium hexaaluminate phase; on the other hand, the lattice of titanium-containing calcium hexaaluminate phase is stabilized to prevent desolvation during cooling. Therefore, the TiO$_2$ component in the titanium-containing calcium hexaaluminate material can stably exist in the titanium-containing calcium hexaaluminate phase during the cooling process, which is not easy to desolvent and has good chemical stability.

(3) The TiO$_2$ components in the present disclosure are all able to stably exist in the titanium-containing calcium hexaaluminate phase during the heating-cooling process, avoiding the occurrence of solution-desolvation phenomenon during the heating-cooling process. When the temperature change occurs, the material internal components and the structural changes are not large, which effectively reduces the probability of heat stress generation. Therefore, the titanium-containing calcium hexaaluminate material has good thermal shock resistance.

(4) The product of the present disclosure has a low content of impurity phases, where the main material phase composition is $Ca((Al_{0.84}Ti_{0.16})_2)_6O_{19}$ phase. The material components are uniform with both $TiO_2$ and $Al_2O_3$ components in the material phase. When it is in contact with the titanium-aluminum alloy melt, the interactions of Ti components and Al components in the alloy melt and the refractory material are inhibited simultaneously. Therefore, the erosion of the titanium aluminum alloy melt is better resisted. The product is an ideal raw material to prepare refractory materials for titanium-aluminum alloy melting.

As examined, the content of $Ca((Al_{0.84}Ti_{0.16})_2)_6O_{19}$ phase in the titanium-containing calcium hexaaluminate material prepared in the present disclosure was more than 90 wt %.

Therefore, the present disclosure has low cost and simple process, and the prepared titanium-containing calcium hexaaluminate material has the characteristics of good chemical stability, high thermal shock resistance and strong melt resistance to titanium-aluminum alloy, which is an ideal raw material for preparing refractory material for titanium-aluminum alloy melting.

We claim:

1. A method of preparing a titanium-containing calcium hexaaluminate material, comprising:
    blending 60-80 wt % alumina powder, 5-20 wt % calcium-containing powder, 10-20 wt % titania powder and 1-10 wt % manganese oxide powder in a planetary ball mill to obtain a blend;
    machine pressing the blend under 100-200 MPa to obtain a green body;
    drying the green body at 110-200° C. for 12-36 h; and
    incubating the dried green body at 1500-1800° C. for 1-8 h to obtain the titanium-containing calcium hexaaluminate material.

2. The method of claim 1, wherein a $Al_2O_3$ content of the alumina powder is 98 wt % or more, and a particle size $D_{50}$ of the alumina powder is 1-8 μm.

3. The method of claim 1, wherein the calcium-containing powder is one or more of calcium hydroxide and calcium carbonate; and a particle size $D_{50}$ of the calcium-containing powder is 1-10 μm.

4. The method of claim 1, wherein a $TiO_2$ content of the titania powder is 90 wt % or more, and a particle size $D_{50}$ of the titania powder is 1-10 μm.

5. The method of claim 1, wherein a MnO content of the manganese oxide powder is 90 wt % or more, and a particle size $D_{50}$ of the manganese oxide powder 1-8 μm.

* * * * *